US012170381B2

(12) United States Patent
Huber et al.

(10) Patent No.: US 12,170,381 B2
(45) Date of Patent: Dec. 17, 2024

(54) MOTOR CONTROL FOR GAS ENGINE REPLACEMENT DEVICE

(71) Applicant: MILWAUKEE ELECTRIC TOOL CORPORATION, Brookfield, WI (US)

(72) Inventors: Alexander T. Huber, Menomonee Falls, WI (US); My Uyen Nguyen, Cambridge, MA (US)

(73) Assignee: Michael Best & Friedrich LLP, Brookfield, WI (US)

(*) Notice: Subject to any disclaimer, the term of this patent is extended or adjusted under 35 U.S.C. 154(b) by 590 days.

(21) Appl. No.: 17/346,660

(22) Filed: Jun. 14, 2021

(65) Prior Publication Data

US 2021/0399378 A1 Dec. 23, 2021

Related U.S. Application Data

(60) Provisional application No. 63/040,268, filed on Jun. 17, 2020.

(51) Int. Cl.
*H01M 50/244* (2021.01)
*F02B 63/02* (2006.01)
(Continued)

(52) U.S. Cl.
CPC ....... *H01M 50/244* (2021.01); *H01M 50/247* (2021.01); *H02J 7/0045* (2013.01);
(Continued)

(58) Field of Classification Search
CPC ...... H02P 6/14; H02P 6/06; H02P 6/08; H02P 7/14; H02P 29/40; H02K 11/33;
(Continued)

(56) References Cited

U.S. PATENT DOCUMENTS

| 5,149,225 A | 9/1992 | Artzberger |
| 5,387,052 A | 2/1995 | Artzberger |

(Continued)

FOREIGN PATENT DOCUMENTS

| CN | 205188931 U | 4/2016 |
| JP | 2008259338 A | 10/2008 |

(Continued)

OTHER PUBLICATIONS

International Search Report and Written Opinion for Application No. PCT/US2021/037189 dated Oct. 7, 2021 (8 pages).

(Continued)

*Primary Examiner* — Said Bouziane
(74) *Attorney, Agent, or Firm* — Michael Best & Friedrich LLP

(57) ABSTRACT

Gas-engine replacement devices described herein include a housing that includes battery receptacle configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to receive a current measurement associated with the motor and control the power switching network according to one of a freewheeling mode or a synchronous rectification mode based on the current measurement.

19 Claims, 14 Drawing Sheets

(51) Int. Cl.
 *H01M 50/247* (2021.01)
 *H02J 7/00* (2006.01)
 *H02P 6/06* (2006.01)

(52) U.S. Cl.
 CPC ............... *H02P 6/06* (2013.01); *F02B 63/02* (2013.01); *H02J 2310/18* (2020.01)

(58) Field of Classification Search
 CPC ........ H02K 11/28; H02K 11/35; H02K 5/225; H02K 7/145; H01M 50/244; H01M 50/247; H02J 7/0045; H02J 2310/18; F02B 63/02
 See application file for complete search history.

(56) References Cited

U.S. PATENT DOCUMENTS

| | | | |
|---|---|---|---|
| 5,402,045 A * | 3/1995 | Mori | H02P 6/10 318/400.4 |
| 6,437,462 B1 | 8/2002 | Maple et al. | |
| 8,432,114 B2 | 4/2013 | Clothier | |
| 9,154,009 B2 | 10/2015 | Alemu | |
| 9,590,518 B2 | 3/2017 | Yan et al. | |
| 2008/0297959 A1 | 12/2008 | Tanabe et al. | |
| 2011/0254489 A1 | 10/2011 | Greetham | |
| 2016/0315570 A1 | 10/2016 | Hayashi et al. | |
| 2017/0331400 A1 * | 11/2017 | Saha | H02P 29/00 |
| 2018/0138839 A1 * | 5/2018 | Puzio | H02K 11/28 |
| 2018/0175780 A1 * | 6/2018 | Hall | E05F 15/605 |
| 2018/0287480 A1 | 10/2018 | Wong et al. | |
| 2019/0006980 A1 | 1/2019 | Sheeks et al. | |
| 2019/0238083 A1 | 8/2019 | White et al. | |
| 2020/0001446 A1 | 1/2020 | Ballard et al. | |
| 2020/0076337 A1 | 3/2020 | Abbott et al. | |

FOREIGN PATENT DOCUMENTS

| | | |
|---|---|---|
| JP | 2011079510 A | 4/2011 |
| JP | 2016208633 A | 12/2016 |

OTHER PUBLICATIONS

Extended European Search Report for Application No. 21826207.9 dated Oct. 24, 2023 (10 pages).

Japanese Patent Office Action for Application No. 2022-576105 dated Dec. 5, 2023 (16 pages including machine English translation).

* cited by examiner

MOTOR CONTROL FOR GAS ENGINE REPLACEMENT DEVICE

RELATED APPLICATIONS

This application claims the benefit of U.S. Provisional Patent Application No. 63/040,268, filed on Jun. 17, 2020, the entire content of which is hereby incorporated by reference.

FIELD

This application relates to gas engine replacement motor units and, more particularly, to gas engine replacement motor units for use with power equipment.

BACKGROUND

Small, single, or multi-cylinder gasoline engines can be mounted to power equipment to drive the equipment with a power take-off shaft.

SUMMARY

Gas-engine replacement devices described herein include a housing that includes battery receptacle configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to receive a current measurement associated with the motor and control the power switching network according to one of a freewheeling mode or a synchronous rectification mode based on the current measurement.

Devices described herein include a motor, a power switching network configured to selectively provide power to the motor, and an electronic processor coupled to the power switching network and configured to receive a current measurement associated with the motor, and control the power switching network according to one of a freewheeling mode or a synchronous rectification mode based on the current measurement.

Methods for operating a gas-engine replacement device described herein provide, where the gas-engine replacement device includes a housing, the housing includes a battery receptacle configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The method includes the electronic processor receiving a current measurement associated with the motor and controlling the power switching network according to one of a freewheeling mode or a synchronous rectification mode based on the current measurement.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments.

Other features and aspects will become apparent by consideration of the following detailed description and accompanying drawings.

DETAILED DESCRIPTION

Figure 1:
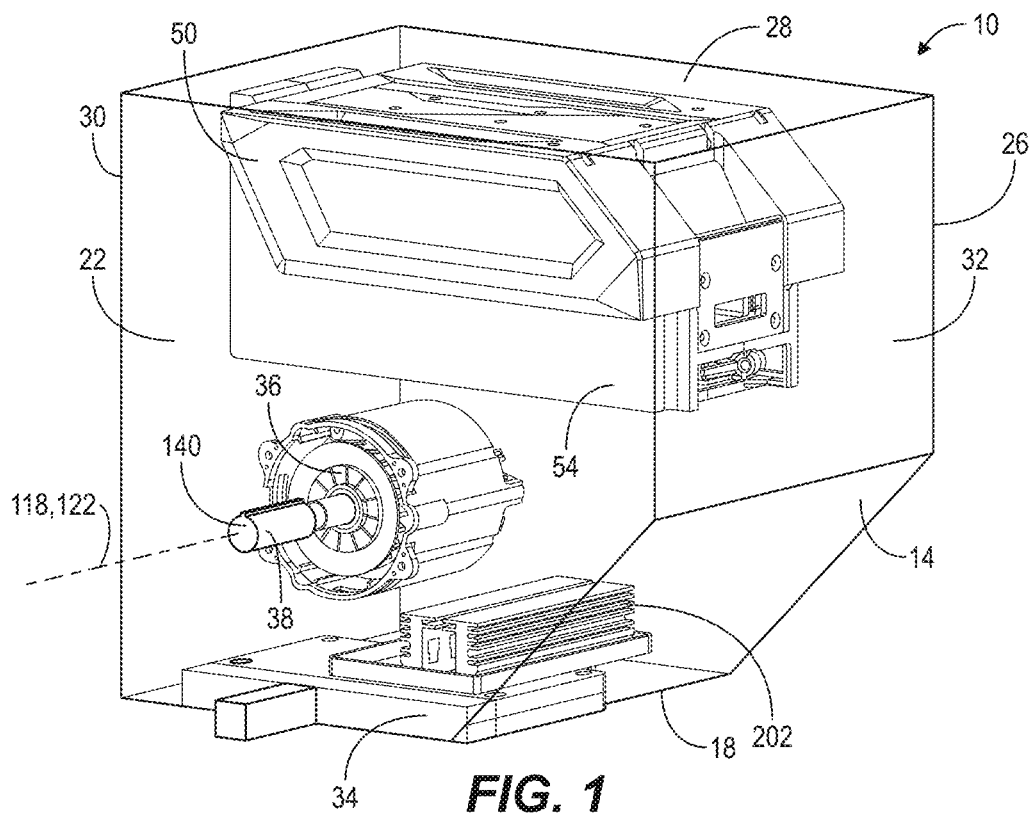
FIG. 1 is a perspective view of a gas engine replacement device in accordance with an embodiment.
Figure 2:
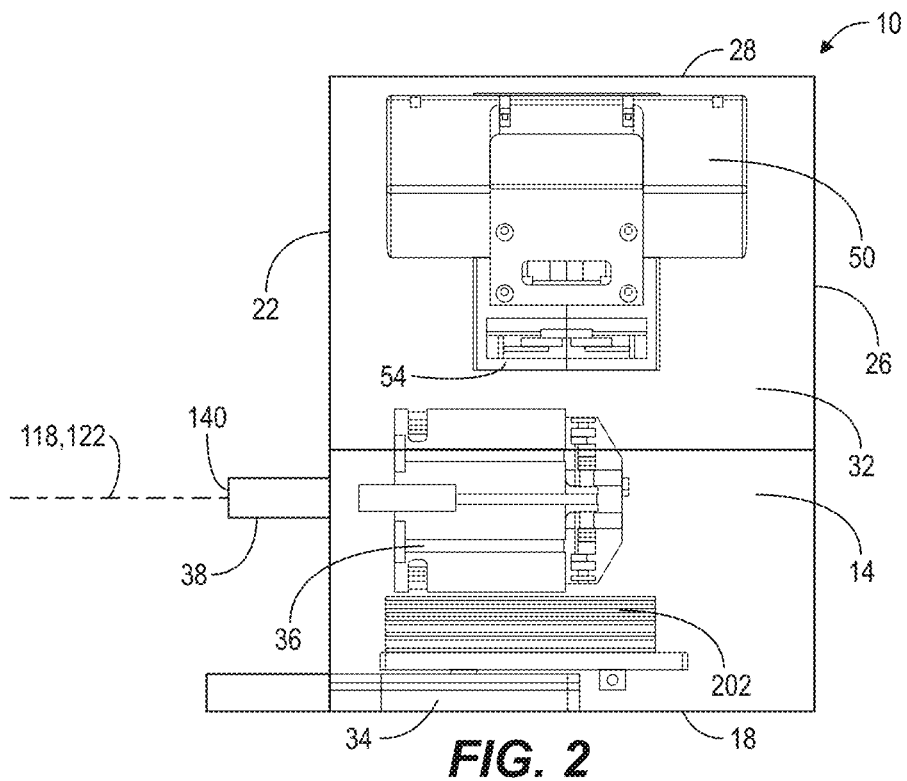
FIG. 2 is a plan view of the gas engine replacement device of FIG. 1.
Figure 3:
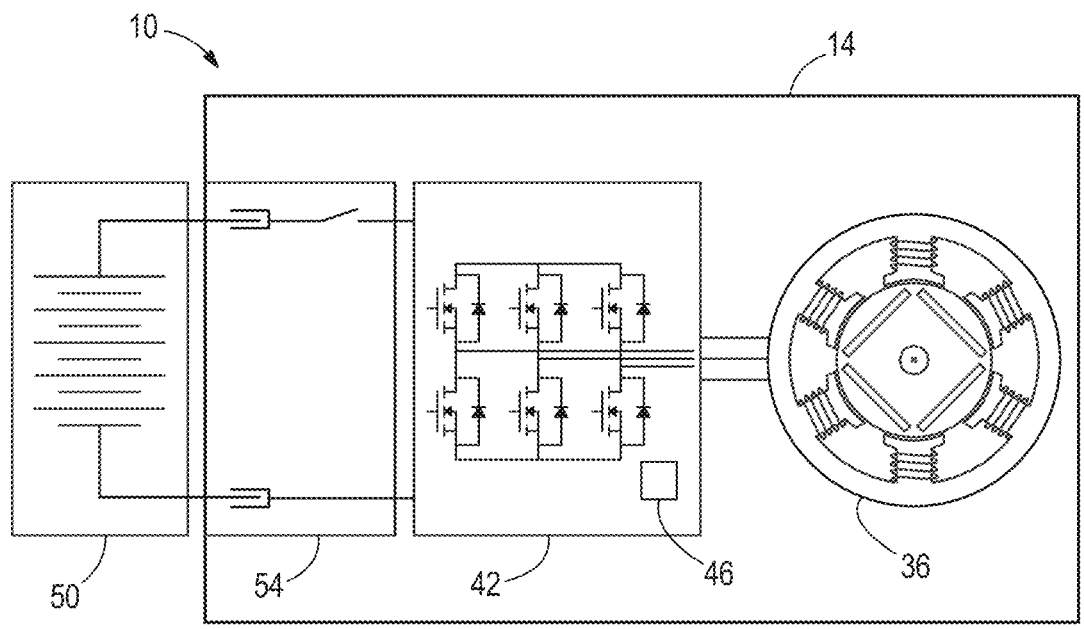
FIG. 3 is a schematic view of the gas engine replacement device of FIG. 1.

As shown in FIGS. 1 and 2, a gas engine replacement device 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. Patent Application Publication No. 2020/0076337, filed Aug. 26, 2019, the entire content of which is incorporated herein by reference.

Figure 4:
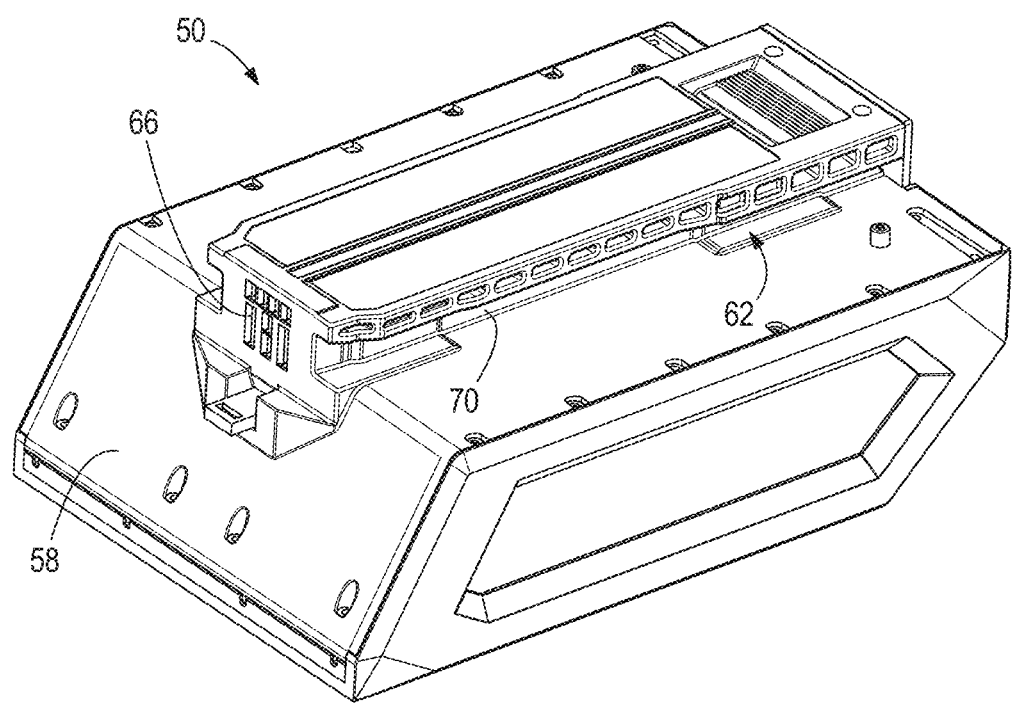
FIG. 4 is a perspective view of a battery pack of the gas engine replacement device of FIG. 1.
Figure 5:
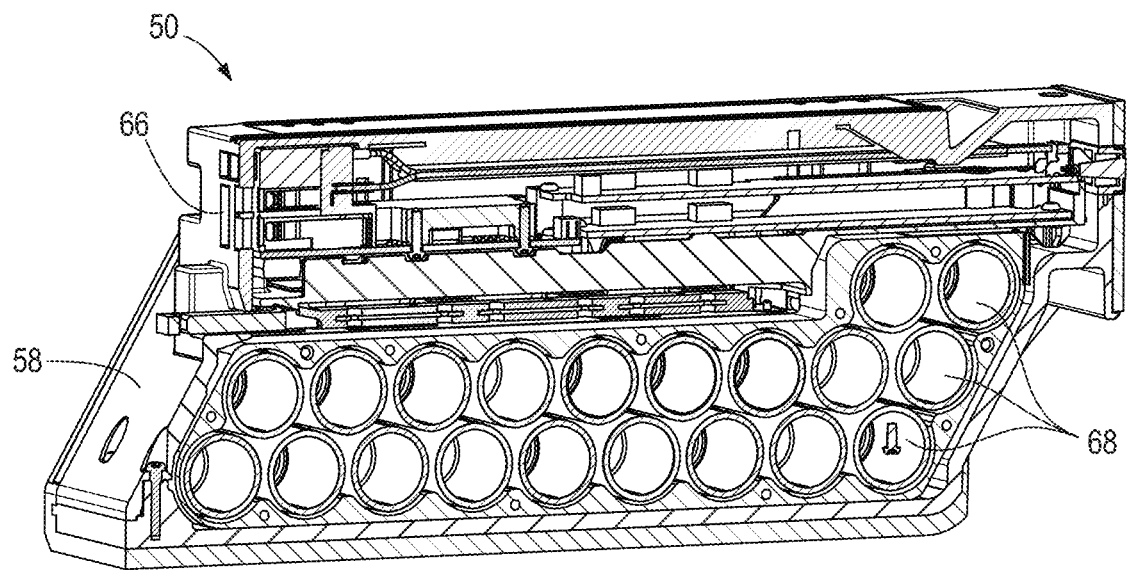
FIG. 5 is a cross-sectional view of the battery pack of FIG. 4.
Figure 6:
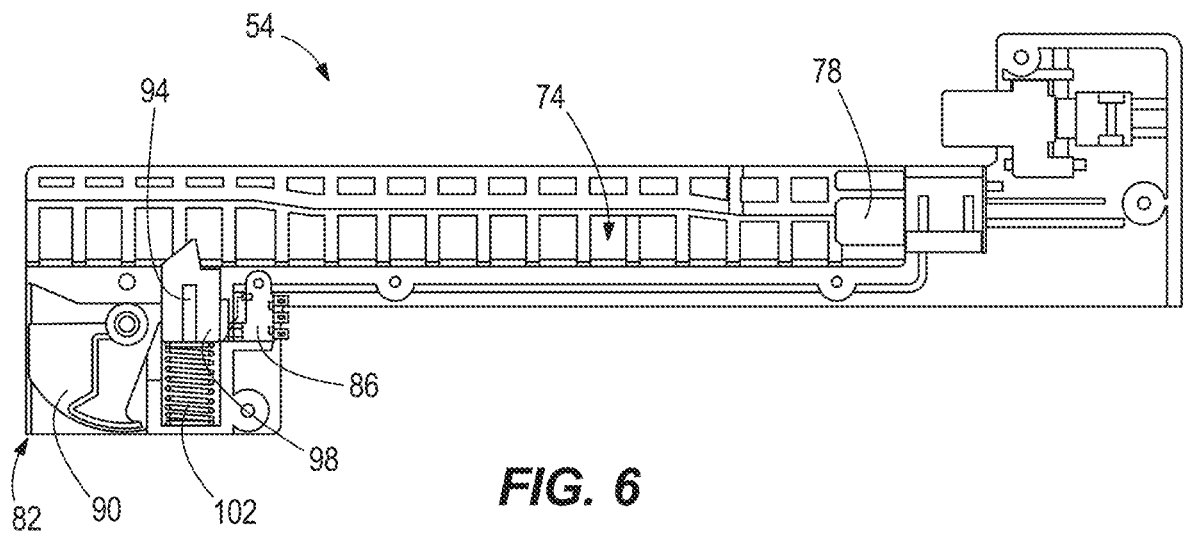
FIG. 6 is a cross-sectional view of a battery receptacle of the gas engine replacement device of FIG. 1.

As shown in FIGS. 1-6, the gas engine replacement device 10 also includes a battery pack 50 that is removably received in a battery pack receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the battery pack housing 58. The support portion 62 provides a slide-on arrangement with a projection/recess portion 70 cooperating with a complementary projection/recess portion 74 (shown in FIG. 6) of the battery pack receptacle 54. In the embodiment illustrated in FIGS. 4-6, the projection/recess portion 70 of the battery pack 50 is a guide rail and the projection/recess portion 74 of the battery pack receptacle 54 is a guide recess. A similar battery pack is described and illustrated in U.S. Patent Application Publication No. 2019/0006980, filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery pack receptacle 54 of the gas engine replacement device 10 in accordance with some embodiments. The battery pack receptacle 54 includes the projection/recess portion 74, a second terminal 78, a latching mechanism 82, and a power disconnect switch 86. The projection/recess portion 74 cooperates with the projection/recess portion 70 of the battery pack 50 to attach the battery pack 50 to the battery pack receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery pack receptacle 54 and is configured to engage the battery pack 50 to maintain engagement between the battery pack 50 and the battery pack receptacle 54. Thus, the battery pack 50 is connectable to and supportable by the battery pack receptacle 54 such that the battery pack 50 is supportable by the housing 14 of the gas engine replacement device 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery pack receptacle 54) such that the latching mechanism 82 engages corresponding structure on the battery pack 50 to maintain engagement between the battery pack 50 and the battery pack receptacle 54. The latching mechanism 82 includes a pivotable actuator or handle 90 operatively engaging a latch member 94. The latch member 94 is slidably disposed in a bore of the battery pack receptacle 54 and is biased toward a latching position by a biasing member 102 (e.g., a spring) to protrude through a surface of the battery pack receptacle 54 and into a cavity in the battery pack 50.

The latching mechanism also 82 includes the power disconnect switch 86 (e.g., a micro-switch) facilitating electrical connecting/disconnecting the battery pack 50 from the battery pack receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery pack receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10.

When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
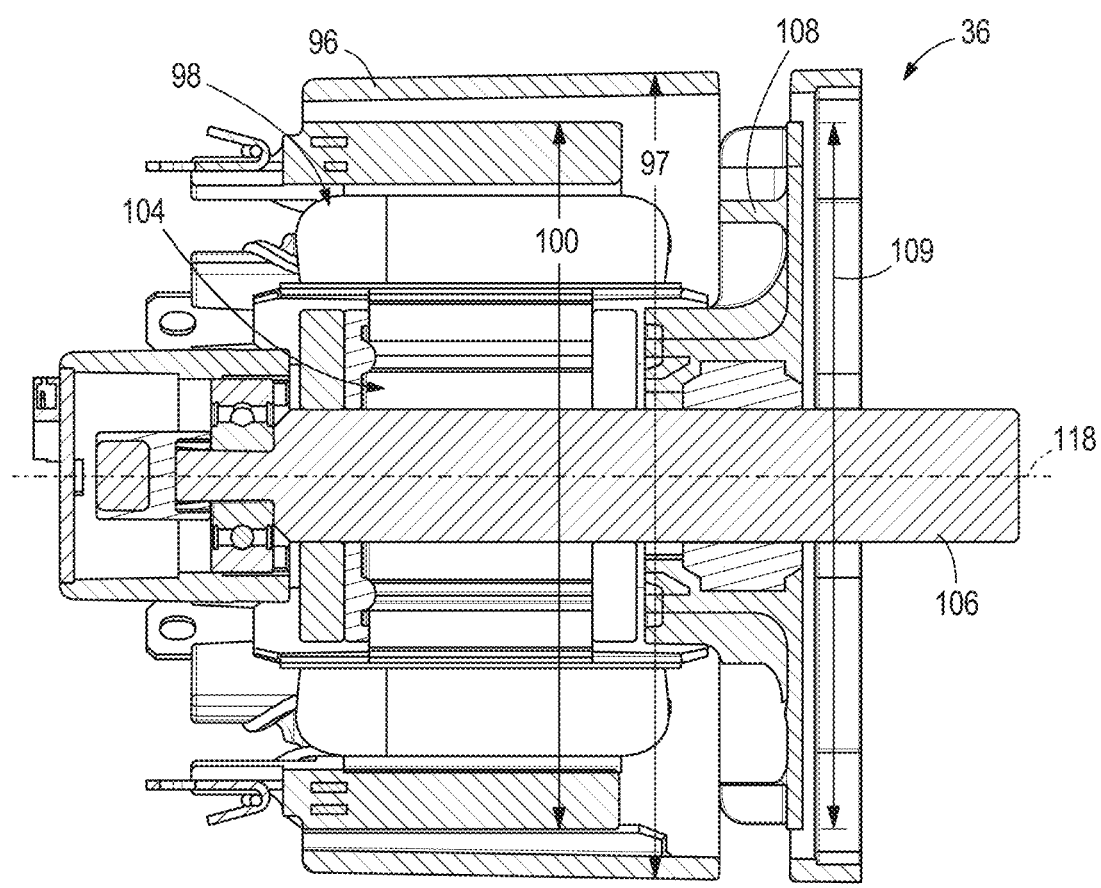
FIG. 7 is a cross-sectional view of a motor of the gas engine replacement device of FIG. 1.

As shown in FIG. 7, the motor 36 includes a motor housing 96 having an outer diameter 97, a stator 98 having a nominal outer diameter 100 of up to about 80 mm, a rotor 104 having an output shaft 106 and supported for rotation within the stator 98, and a fan 108. A similar motor is described and illustrated in U.S. Patent Application Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch for quick overload control. In some embodiments, the motor 36 has a volume of up to about 443,619 $mm^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor) of up to about 80 mm.

Figure 8:
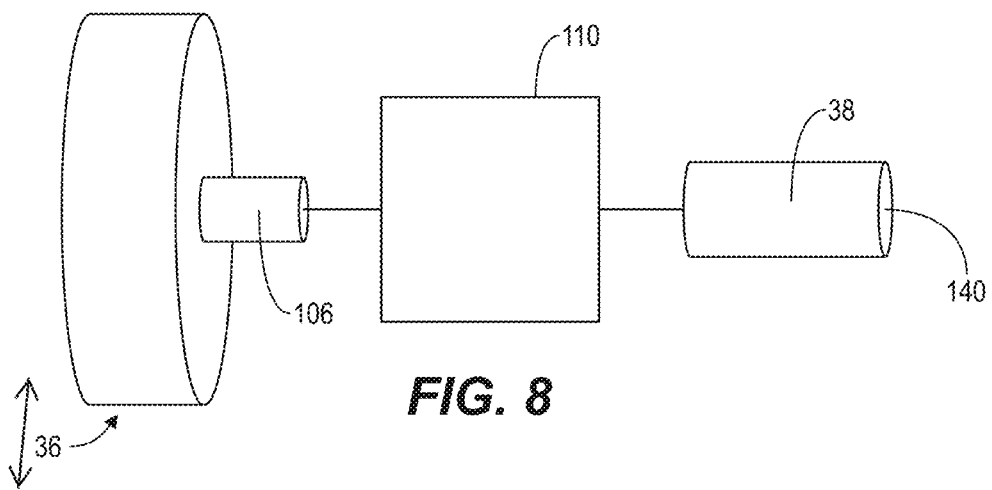
FIG. 8 is a schematic view of a motor, a gear train, and a power take-off shaft of the gas engine replacement device of FIG. 1.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators. In some embodiments, the gas engine replacement device 10 includes a filter to keep airborne debris out of the motor 36 and control electronics 42. In some embodiments, the filter includes a dirty filter sensor and a self-cleaning mechanism. In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 104 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius. Tables 1 and 2 below list with further specificity the temperature limits of different components on the housing 14 of the gas engine replacement device 10.

Table 1 below lists the Underwriter's Laboratories (UL) temperature limits of different components typically used in power tools, with respect to whether those components are formed of metal, plastic, rubber, wood, porcelain, or vitreous. For example, at least in some embodiments, the plastic rated temperatures are never exceeded by the gas engine replacement device 10.

TABLE 1

UL MATERIAL TEMPERATURE LIMITS

|  | METAL | PLASTIC/ RUBBER/ WOOD | PORCELAIN/ VITREOUS |
|---|---|---|---|
| CASUAL CONTACT | 85° C. | 85° C. | 85° C. |
| HANDLES AND KNOBS THAT ARE CONTINUOUSLY HELD | 55° C. | 75° C. | 65° C. |
| HANDLES AND KNOBS THAT ARE ONLY BRIEFLY HELD (E.G. SWITCHES) | 60° C. | 80° C. | 70° C. |

Table 2 below lists the UL temperature limits of different components of the battery pack housing 58 of the battery pack 50, with respect to whether those components are formed of metal, plastic or rubber. For example, at least in some embodiments, the plastic rated temperatures are never exceeded by the gas engine replacement device 10.

TABLE 2

UL MATERIAL TEMPERATURE LIMITS

|  | METAL | PLASTIC/ RUBBER |
|---|---|---|
| CASUAL CONTACT | 70° C. | 95° C. |
| HANDLES AND KNOBS THAT ARE CONTINUOUSLY HELD | 55° C. | 75° C. |
| HANDLES AND KNOBS THAT ARE ONLY BRIEFLY HELD (E.G., SWITCHES) | 60° C. | 85° C. |

Figure 9:
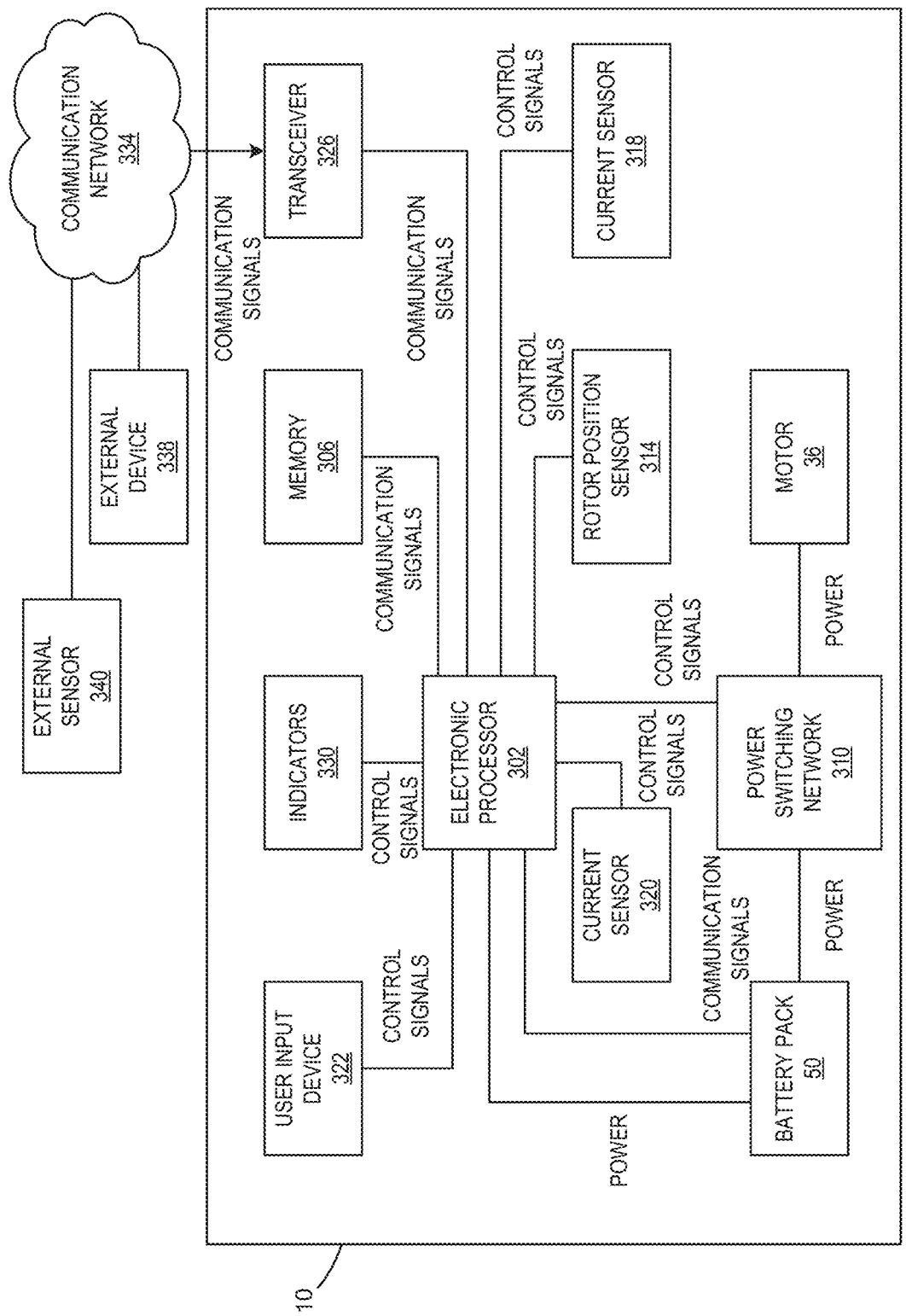
FIG. 9 is a block diagram of the gas engine replacement device of FIG. 1.

FIG. 9 illustrates a simplified block diagram of the gas engine replacement device 10 according to one example embodiment. As shown in FIG. 9, the gas engine replacement device 10 includes an electronic processor 302, a memory 306, the battery pack 50, a power switching network 310, the motor 36, a rotor position sensor 314, a motor current sensor 318, a user input device 322 (e.g., a throttle, trigger, or power button), a transceiver 326, indicators 330 (e.g., light-emitting diodes), and a battery current sensor 320. In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, motor current sensor 318, user input device 322, transceiver 326, indicators 330, and battery current sensor 320 form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably attached to the housing of the gas engine replacement device 10 such that a different battery pack 50 may be attached and removed to the gas engine replacement device 10 to provide different amount of power to the gas engine replacement device 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-8.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar junction transistors, or other types of electrical switches. For instance, the power switching network 310 may include a six-FET bridge (see FIGS. 10A-10C) that receives pulse-width modulated (PWM) signals from the electronic processor 302 to drive the motor 36.

The rotor position sensor 314 and the motor current sensor 318 are coupled to the electronic processor 302 and communicate to the electronic processor 302 various control signals indicative of different parameters of the gas engine replacement device 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor.

The motor current sensor 318 monitors or detects a current level of the motor 36 during operation of the gas engine replacement device 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device 338 (e.g., a smart phone, tablet, or laptop computer) over a wired or wireless communication network 334. In some embodiments, the transceiver 326 may comprise separate transmitting and receiving components. In some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302. In some embodiments, the transceiver 326 communicates with one or more external sensors 340 via the communication network 334. For example, an external sensor 340 may be associated with the equipment to which the gas engine replacement device 10 is mounted. In some embodiments, the external sensor 340 is a speed sensor, a position sensor, or the like.

The communication network 334 provides a wired or wireless connection between the gas engine replacement device 10, the external device 338, and the external sensor 340. The communication network 334 may comprise a short range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, etc. The indicators 330 may also include elements to convey information to a user through audible or tactile outputs. In some embodiments, the indicators 330 include an eco-indicator that indicates an amount of power being used by the load during operation.

The connections shown between components of the gas engine replacement device 10 are simplified in FIG. 9. In practice, the wiring of the gas engine replacement device 10 is more complex, as the components of a gas engine replacement device are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

Figure 10A:
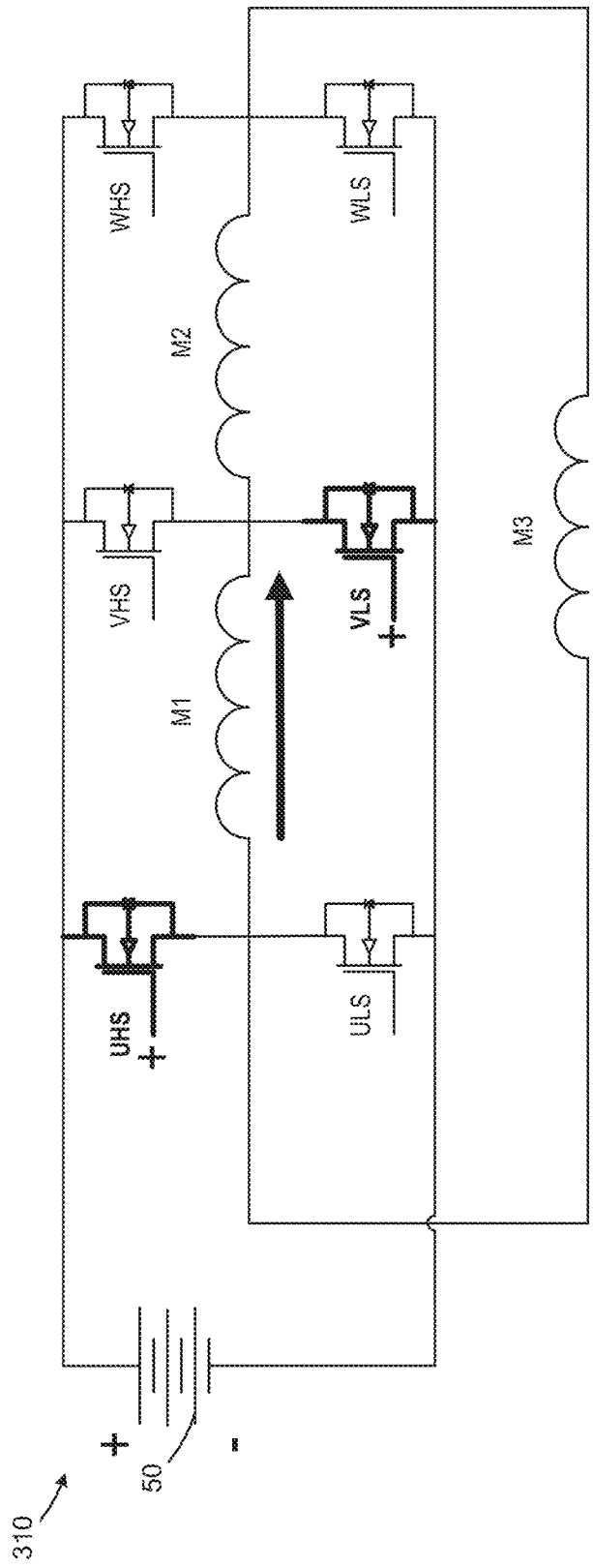
FIGS. 10A, 10B, and 10C are schematic views of a power switching network for driving the motor of the gas engine replacement device of FIG. 1 during freewheeling and synchronous rectification modes.
Figure 10B:
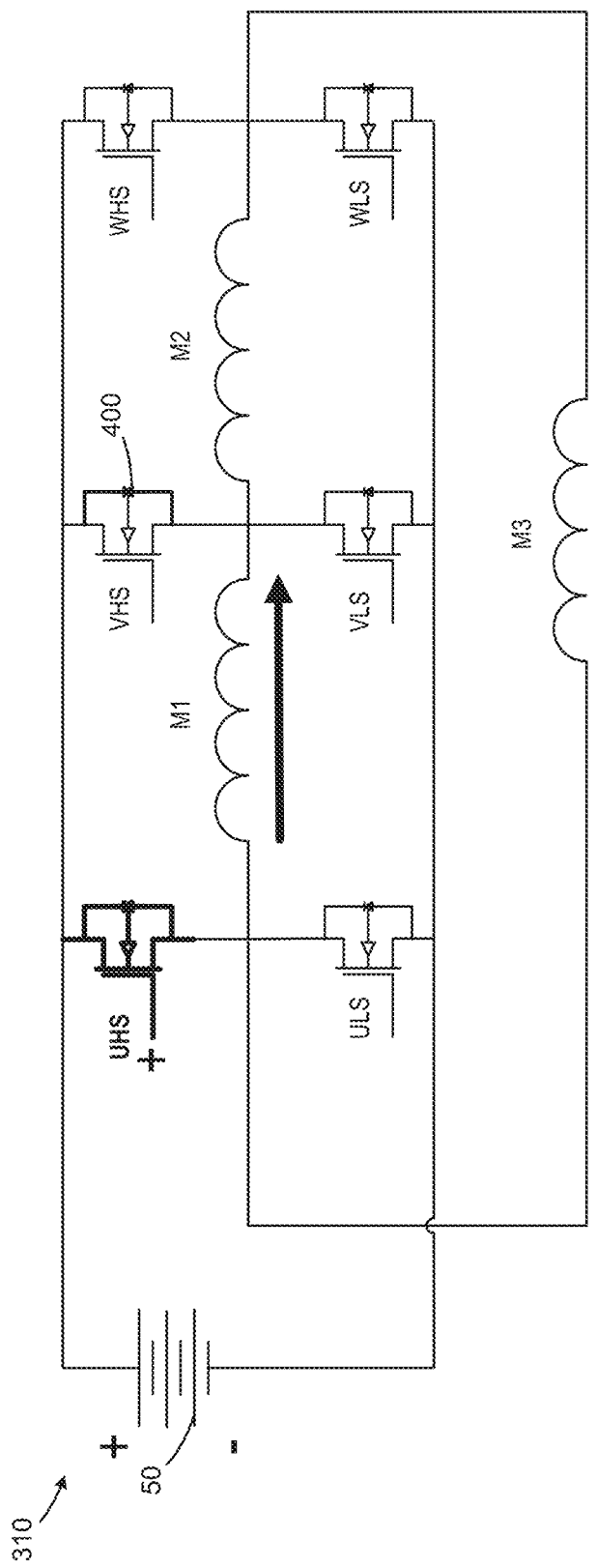
Figure 10C:
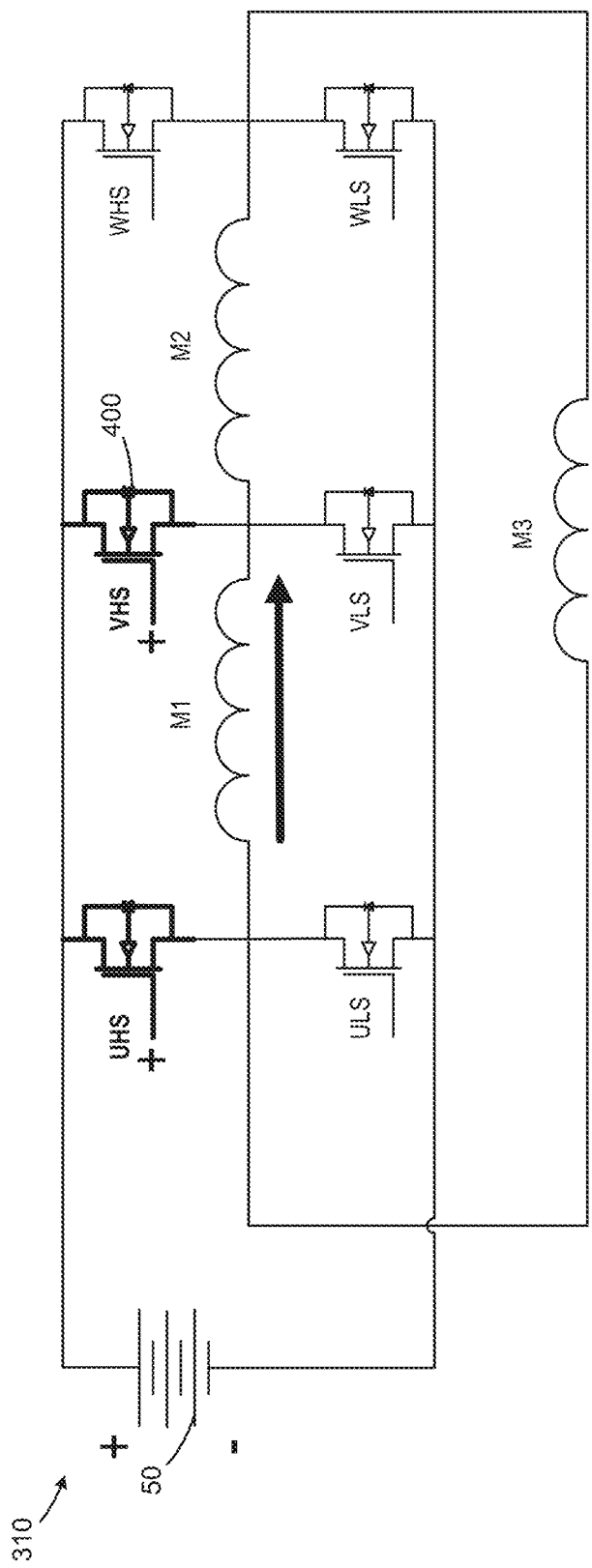
Figure 11:
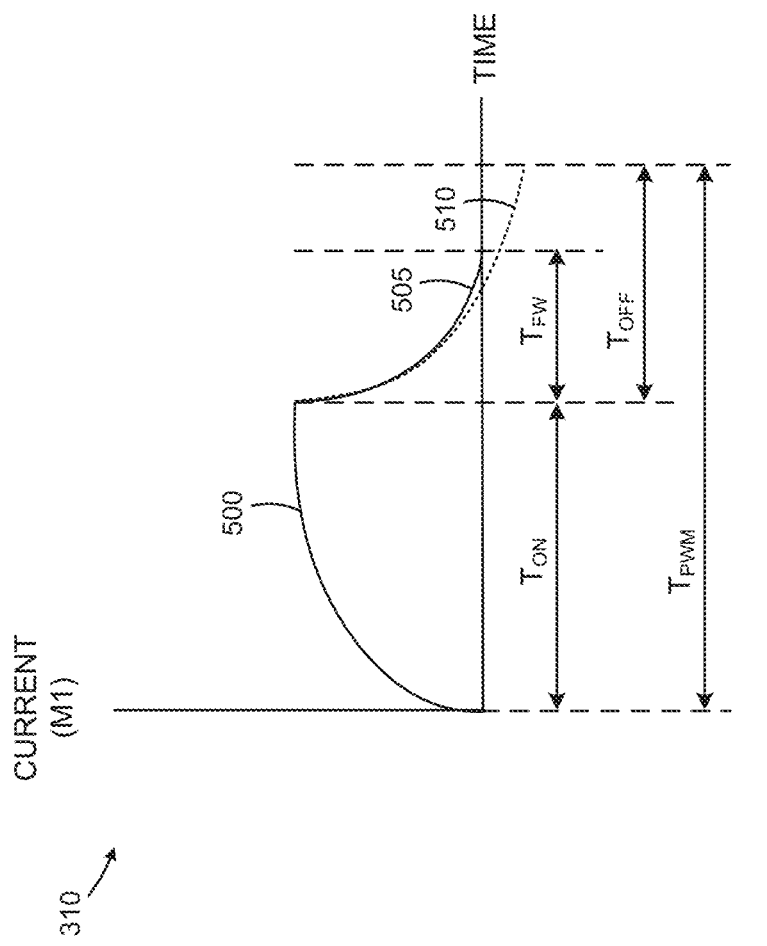
FIG. 11 is a diagram illustrating the phase motor current during on and off intervals under freewheeling and synchronous rectification modes.

FIGS. 10A-10C illustrate one example of the power switching network 310 for powering the motor 36, and the operation of the power switching network 310 during different portions of a PWM cycle. FIG. 11 illustrates motor current during the PWM cycle. The electronic processor 302 controls the power switching network 310 to power the motor.

As illustrated in FIG. 10A, the power switching network 310 includes three high side FETs, UHS, VHS, WHS, and three low-side FETs, ULS, VLS, WLS each having a first conducting state and a second non-conducting state. The motor 36 has windings M1, M2, M3. The power switching network 210 is used to selectively apply power from the battery pack 50 to the motor 36. The high-side switches and the low side switches may be controlled by the electronic processor 302 using pulse-width modulated ("PWM") commutation, centerline commutation, or other commutation schemes. In some embodiments, a PWM commutation sequence is used to control the motor 36 to rotate in a forward direction. Each of the high-side FETs UHS, VHS, WHS is periodically conducting during a commutation phase. When one of the FETs UHS, VHS, WHS stops conducting, the next high-side FET begins conducting. Similarly, each of the low-side FETs ULS, VLS, WLS is periodically conducting during the commutation phase. When one of the FETs ULS, VLS, WLS stops conducting, the next low-side FET begins conducting. However, one or both of the high-side or low-side FETs may be activated for only a period of the commutations phase (e.g., with a PWM signal having a 75%, 50%, 25%, or another duty ratio) based on the desired speed of the motor 36 or the load on the motor 36. To drive the motor 36 in a forward direction, the high-side and low-side FETs are activated in predetermined pairs and in a predetermined sequence. For example, UHS and VLS are first activated, followed by VHS and WLS, followed by WHS and ULS. This sequence is continued for the duration of the runtime of the motor 36 in the forward operation. To rotate in a reverse direction, UHS and WLS are first activated, followed by WHS and VLS, followed by VHS and ULS. This sequence is continued for the duration of the runtime of the motor 36 in the reverse operation. In some embodiments, one or more variations to the sequence can be performed based on the desired motor operation. For example, one or both of the high-side and low-side FETs may be switched at a frequency during their activation phase to control the speed of the motor. Additionally, the activation phases of the high-side and low-side FETs may be shifted to create an overlap with other activations to achieve different controls (e.g., field oriented control).

FIG. 10A illustrates the power switching network 310 during a portion of PWM cycle where the winding M1 is being powered, represented by an interval, $T_{ON}$, in FIG. 11. The total PWM cycle is represented by an interval, $T_{PWM}$, in FIG. 11 The FETs UHS and VLS are active, causing current to flow from the battery to the winding M1, as represented by the signal 500 in FIG. 11. In the example of FIGS. 10A-10C, PWM is applied to the FET VLS control signal by enabling and disabling the VLS control signal at a particular duty cycle and frequency.

The electronic processor 302 controls the power switching network 310 using two different rectification modes, a freewheeling ("FW") mode and a synchronous rectification ("SR") mode. As described in greater detail below, the selected rectification mode depends on factors such as motor current, source current, PWM frequency, duty cycle, or the like. When the FET VLS is turned off, represented by an interval, $T_{OFF}$, in FIG. 11, the motor current decays. The manner in which the current decays depends on the rectification mode.

FIG. 10B illustrates the configuration of the power switching network 310 in the FW mode. As illustrated in FIG. 10B, the FET UHS remains enabled, and the FET VLS is turned off. The current decays during an interval, $T_{FW}$, in FIG. 11, by flowing through a body diode 400 of the FET VHS to create a current loop with the FET UHS. The body diode 400 conducts the freewheeling current and switches off to block any discontinuous current once the diode becomes reverse biased, as represented by the signal 505. The current decays as represented by the signal 505. A voltage drop across the body diode 400 causes power losses and heating during the decay.

FIG. 10C illustrates the configuration of the power switching network 310 in the SR mode. Synchronous rectification is employed to reduce power losses and increase system efficiency during the $T_{OFF}$ interval. Since the ON resistance of the FET VHS is lower than the ON resistance of the body diode 400, the power loss and heating can be reduced (compared to FIG. 10B) by enabling the FET VHS during the $T_{OFF}$ interval. As illustrated in FIG. 10C, the FET UHS remains enabled, the FET VLS is turned off, and the FET VHS is enabled. The current decays by flowing through the current loop defined by the FETs UHS, VHS. In some embodiments, synchronous rectification is applied to devices other than gas engine replacement devices (e.g., other hand-held or similar power tools that did not previously include a gas engine).

However, an undesirable affect may be present when SR mode is applied under some operating conditions, such as when $T_{OFF}>T_{ON}$. In some cases, the motor 36 has very low impedance—specifically, inductance. Due to this low inductance, switching currents in the motor 36 decay quickly. When SR mode is used, a quickly decaying phase current can become discontinuous. When this situation occurs, energy is removed from the back EMF of the motor 36, reversing the current in the winding and leading to lower motor efficiency and higher heating, as represented by the signal 510 in FIG. 11. Note that the signal 510 is undesirable, and, as described in greater detail below, the electronic processor 302 controls the operating mode to avoid discontinuous operation.

The example of FIG. 10C involves applying the PWM signal to the FET VLS and enabling the FET VHS when the FET VLS is disabled in the PWM duty cycle. In some embodiments, the PWM signal is alternatively applied to the FET UHS while the FET VLS remains enabled, and the FET ULS is enabled when the FET VLS is disabled during the PWM duty cycle to provide synchronous rectification.

Figure 12:
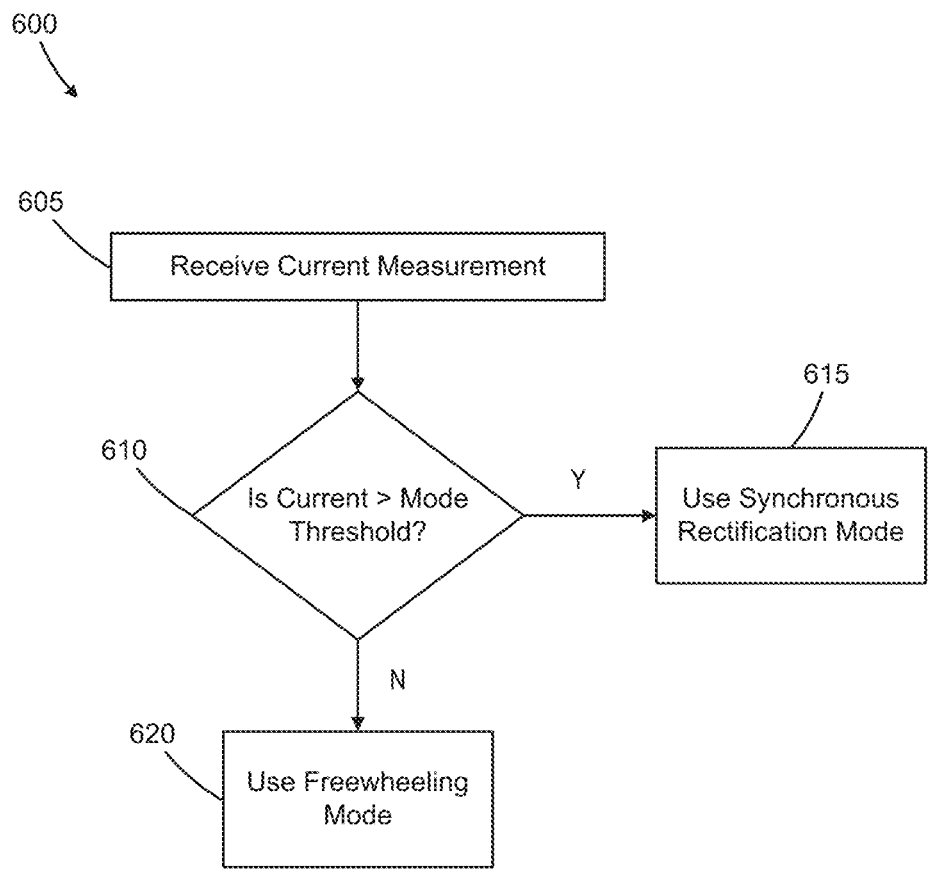
FIG. 12 is a flowchart of an example method for controlling the rectification mode of the motor of the gas engine replacement device of FIG. 1.
Figure 13A:
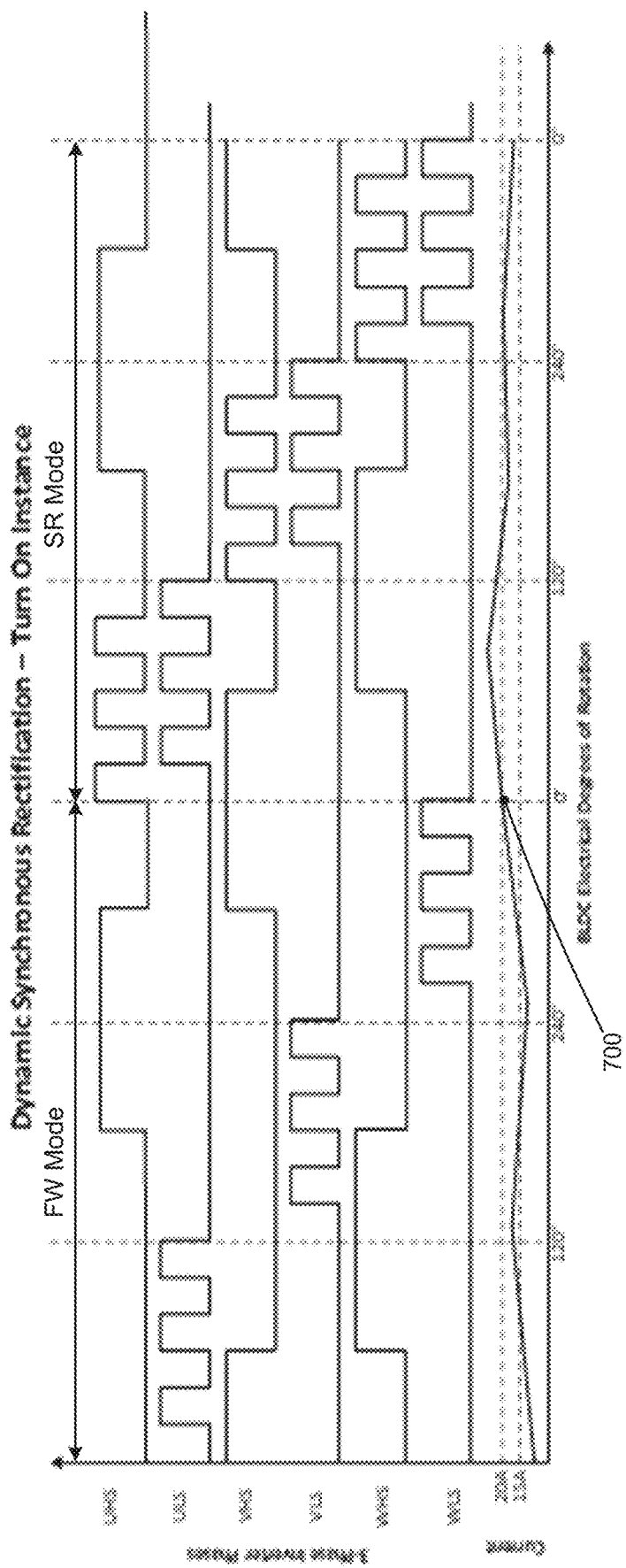
FIGS. 13A and 13B are timing diagrams illustrating rectification mode changes using the method of FIG. 12.
Figure 13B:
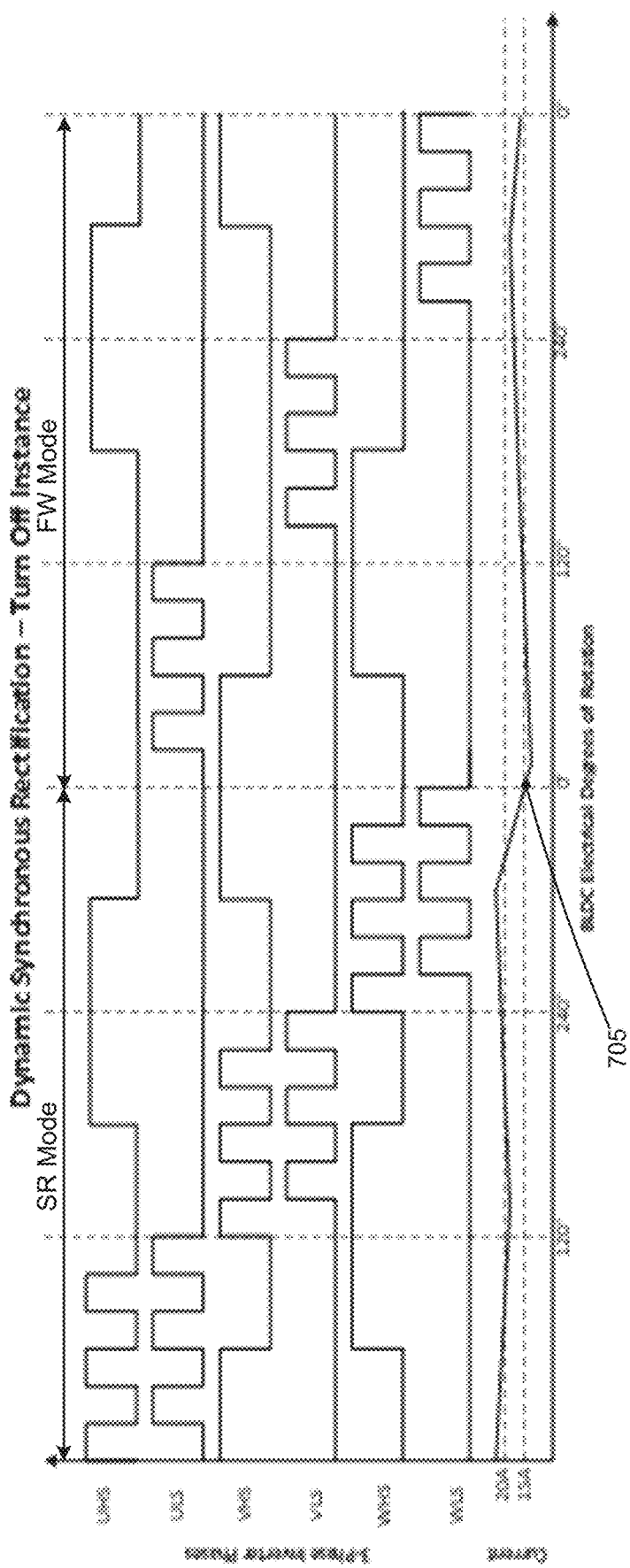

FIG. 12 is a flowchart of an example method 600 for controlling the rectification mode of the motor 36 of the gas engine replacement device 10 of FIG. 1. FIGS. 13A and 13B are timing diagrams illustrating rectification mode changes using the method 600 of FIG. 12.

Referring to FIG. 12, the electronic processor 302 receives a current measurement, as shown in block 605. In some embodiments, the electronic processor 302 controls the rectification mode based on the current measurement, such as motor current sensed by the motor current sensor 318 or source current measured by the battery current sensor 320. In some embodiments, the motor current measurement is indirect. For example, motor torque or output torque measurement is an indirect measurement of motor current (e.g., an estimation of motor current).

As shown in block 610, the electronic processor 302 determines if the current is greater than a mode threshold. For a given motor 36, a current range may be empirically determined where discontinuous conduction occurs if SR mode is employed. The mode threshold is selected to be above a current range where discontinuous conduction occurs for the motor 36.

If the current is greater than the mode threshold in block 610, the electronic processor 302 employs synchronous rectification mode in block 615. If the current is not greater than the mode threshold in block 610, the electronic processor 302 employs freewheeling mode in block 620. The SR mode and FW mode intervals are labeled in FIGS. 13A and 13B. As seen in FIGS. 13A and 13B, in the SR mode, the FET VHS is turned on when the FET VLS is turned off to provide the active current decay described in FIG. 10C.

In some embodiments, a hysteresis band is employed to avoid oscillation of the rectification mode if the current is near the mode threshold. Accordingly, the mode threshold may be adjusted depending on the current rectification mode. For example, consider a nominal mode threshold of 15 A. A 5 A hysteresis band may be provided for mode changes. If the electronic processor 302 is operating in FW mode and the current exceeds 20 A (the 15 A nominal threshold plus the hysteresis band), the electronic processor 302 changes to SR mode. As shown in FIG. 13A, the current exceeds 20 A at point 700, and the electronic processor changes from FW mode to SR mode.

If the electronic processor 302 is operating in SR mode and the current falls below the 15 A nominal threshold, the electronic processor 302 changes to FW mode. As shown in FIG. 13B, the current falls below 15 A at point 705, and the electronic processor changes from SR mode to FW mode.

Figure 14:
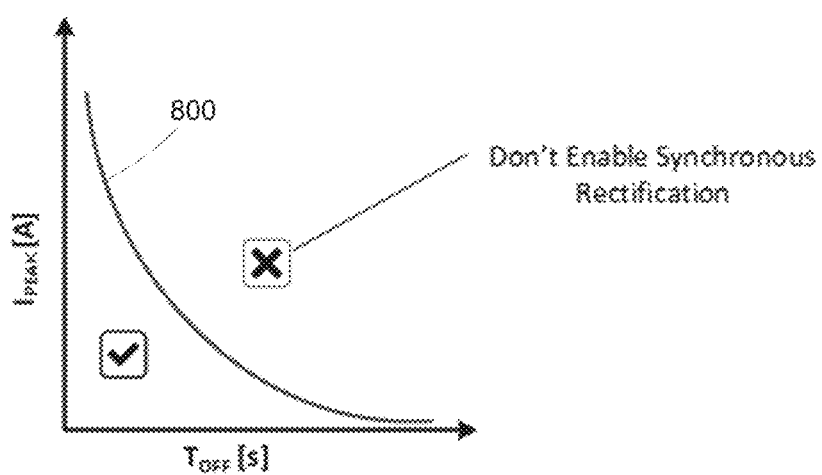
FIG. 14 is a diagram illustrating a rectification mode curve for implementing freewheeling and synchronous rectification modes.

FIG. 14 is a diagram illustrating a rectification mode curve 800 for implementing freewheeling and synchronous rectification modes. In some embodiments, other decision parameters may be included in addition to current. For example, the duty cycle and switching frequency of the PWM signal applied to the motor 36 may be used to calculate $T_{OFF}$. The rectification curve 800 may relate current as a function of $T_{OFF}$ to indicate the current for a given $T_{OFF}$ that results in discontinuous conduction. Thus, operation in SR mode in the region above the curve 800 results in discontinuous conduction, while operation in SR mode in regions below the curve 800 does not result in discontinuous conduction. The curve 800 may be integrated into the processing in the method 600 of FIG. 12, where the mode threshold is dynamically updated based on the operating parameters, such as duty cycle, switching frequency, and current. A hysteresis band may also be incorporated into the curve 800 as described above to prevent oscillation.

Controlling the rectification mode as described herein reduces power consumption, reduces heat generation, and improves efficiency.

The mechanical systems described above driven by the gas engine replacement device 10 include many advantages over conventional equipment driven by an internal combustion engine, some of which are discussed below.

In some embodiments, the gas engine replacement device 10 can be mated with a new equipment and the memory 306 can be reprogrammed to optimize the gas engine replacement device 10 for operation with the new equipment. In some embodiments, the electronic processor 302 automatically recognizes which type of new equipment the gas engine replacement device 10 has been mated with, and governs operation of, the gas engine replacement device 10 accordingly. In some embodiments, the electronic processor 302 can automatically detect with which equipment the gas engine replacement device 10 has been mated via Radio Frequency Identification (RFID) communication with the new equipment.

In some embodiments, the memory 306 is reprogrammable via either BLUETOOTH or Wi-Fi communication protocols. In some embodiments, the electronic processor 302 has control modes for different uses of the same equipment. The control modes may be preset or user-programmable and may be programmed remotely via BLUETOOTH or Wi-Fi. In some embodiments, the electronic processor 302 utilizes master/slave equipment-to-equipment communication and coordination, such that the gas engine replacement device 10 can exert unidirectional control over equipment, or an operator can use a smartphone application to exert unidirectional control over the gas engine replacement device 10.

In some embodiments, the operator or original equipment manufacturer ("OEM") is allowed limited access to control the speed of the gas engine replacement device 10 through the electronic processor 302 via, e.g., a controller area network ("CAN")-like interface. In some embodiments, the electronic processor 302 is capable of a wider range of speed selection with a single gear set in the gear train 110 than a gasoline engine. For example, the control electronics 42 are configured to drive the motor 36 at less than 2,000 RPM, which is lower than any speed a gasoline engine is capable of, which permits the associated equipment to have a greater overall runtime over a full discharge of the battery pack 50, than a gasoline engine. Additionally the control electronics 42 are configured to drive the motor at more than 3,600 RPM, which is higher than any speed a gasoline engine is capable of, and with the capability to deliver more torque. The wider range of speeds of motor 36 offers greater efficiency and capability than a gasoline engine. In some embodiments, the operator could have access to control the current drawn by the motor 36 in addition to the speed.

In some embodiments, the electronic processor 302 is configured to log and report data. For example, the electronic processor 302 is configured to provide wired or wireless diagnostics for monitoring and reading the status of the gas engine replacement device 10. For example, the electronic processor 302 can monitor and log gas engine replacement device 10 runtime for example, in a rental scenario. In some embodiments, the motor 36 and the electronic processor 302 use regenerative braking to charge the battery pack 50. In some embodiments, the gas engine replacement device 10 includes a DC output for lights or accessories. In some embodiments, the electronic processor 302 can detect anomalies or malfunctions of the gas engine replacement device 10 via voltage, current, motion, speed, and/or thermocouples. In some embodiments, the electronic processor 302 can detect unintended use of or stoppage of the gas engine replacement device 10. If the equipment driven by the gas engine replacement device 10 is not running with the intended characteristics or is not being used correctly or safely, the electronic processor 302 can detect the anomaly and deactivate the gas engine replacement device 10. For example, the gas engine replacement device 10 can include one or more accelerometers to sense if the gas engine replacement device 10 and equipment is in the intended orientation. And, if the electronic processor 302 determines that the gas engine replacement device 10 is not in the intended orientation (i.e. the equipment has fallen over), the electronic processor 302 can deactivate the gas engine replacement device 10.

In some embodiments, the gas engine replacement device 10 includes accessible sensor ports (not shown) to electrically connect with user-selected sensors for use with the piece of power equipment, such as accelerometers, gyroscopes, GPS units, or real time clocks, allowing an operator to customize the variables to be sensed and detected by the electronic processor 302. In some embodiments, the electronic processor 302 can indicate the status of the battery pack 50, such as when the battery is running low, to an operator via visual, audio, or tactile notifications. In some embodiments, the electronic processor 302 can operate an auxiliary motor that is separate from the motor 36 to drive an auxiliary device such as a winch. The auxiliary motor may be internal or external to the gas engine replacement device 10.

In some embodiments, the gas engine replacement device 10 can include digital controls on a customizable user interface, such as a touch display or a combination of knobs and buttons. In contrast, an analog gasoline engine does not include such digital controls. In some embodiments, the user interface for the gas engine replacement device 10 can be modular, wired, or wireless and can be attachable to the gas engine replacement device 10 or be hand held. In some embodiments, the gas engine replacement device 10 can be controlled with a remote control that includes status indicators for certain characteristics of the gas engine replacement device 10, such as charge of the battery pack 50 and the temperature. In some embodiments, the gas engine replacement device 10 can provide status indications with a remote, programmable device.

Thus, embodiments described herein provide, among other things, a gas-engine replacement device including synchronous rectification. Various features and advantages are set forth in the following claims.

What is claimed is:

1. A gas-engine replacement device, comprising:
   a housing including a battery receptacle, the battery receptacle configured to removably receive a battery pack;
   a motor located within the housing;
   a power take-off shaft receiving torque from the motor and protruding from a side of the housing;
   a power switching network configured to selectively provide power from the battery pack to the motor; and
   an electronic processor connected to the power switching network and configured to:
      receive a current measurement associated with the motor,
      select a mode threshold based on an operating parameter of the motor, the mode threshold selected to be above a current range where discontinuous conduction occurs for the motor, and
      control the power switching network according to one of a freewheeling mode or a synchronous rectification mode based on the current measurement,
   wherein control in the freewheeling mode is responsive to the current measurement being less than the mode threshold,
   wherein control in the synchronous rectification mode is responsive to the current measurement being greater than the mode threshold.

2. The gas-engine replacement device of claim 1, wherein:
   the motor includes a first winding; and
   the power switching network includes:
      a first high side switch coupled to a first terminal of the first winding,
      a second high side switch coupled to a second terminal of the first winding,
      a first low side switch coupled to the second terminal of the first winding, and
      a second low side switch coupled to the first terminal of the first winding,
   wherein, while operating in the synchronous rectification mode, the electronic processor is configured to enable the first high side switch and the first low side switch, periodically enable and disable the one of the first low side switch and the first high side switch, and enable one of the second high side switch during periods in which the first low side switch is disabled and the second low side switch during periods in which the first high side switch is disabled.

3. The gas-engine replacement device of claim 2, wherein the electronic processor is configured to select the mode threshold and control the power switching network according to one of the freewheeling mode or the synchronous mode by:
   receiving a rectification mode curve indicating current as a function of off time of the first low side switch;
   determining an off time associated with the current measurement based on parameters of a pulse width modulation signal applied to the first low side switch;
   controlling the power switching network in the freewheeling mode responsive to the current measurement being above the rectification mode curve for the determined off time; and
   controlling the power switching network in the synchronous rectification mode responsive to the current measurement being below the rectification mode curve for the determined off time.

4. The gas-engine replacement device of claim 1, wherein:
   the motor includes a first winding; and
   the power switching network includes:
      a first high side switch coupled to a first terminal of the first winding,
      a second high side switch coupled to a second terminal of the first winding, the second high side switch having a body diode; and
      a first low side switch coupled to the second terminal of the first winding,
   wherein, while operating in the freewheeling mode, the electronic processor is configured to enable the first high side switch and periodically enable and disable the first low side switch, and wherein current in the first winding flows through the body diode of the second high side switch during periods in which the first low side switch is disabled.

5. The gas-engine replacement device of claim 1, wherein the current measurement represents current through the motor.

6. The gas-engine replacement device of claim 1, wherein the current measurement represents current supplied by the battery pack.

7. The gas-engine replacement device of claim 1, wherein the electronic processor is configured to apply a hysteresis band to the mode threshold for changing from the freewheeling mode to the synchronous rectification mode and from the synchronous rectification mode to the freewheeling mode.

8. The gas-engine replacement device of claim 1, wherein the operating parameter of the motor is one selected from a group consisting of a duty cycle, a switching frequency, and the current measurement associated with the motor.

9. A device comprising:
   a motor;
   a power switching network configured to selectively provide power to the motor; and
   an electronic processor coupled to the power switching network and configured to:
      receive a current measurement associated with the motor,
      select a mode threshold based on an operating parameter of the motor, the mode threshold selected to be above a current range where discontinuous conduction occurs for the motor, and
      control the power switching network according to one of a freewheeling mode or a synchronous rectification mode based on the current measurement,
      wherein control in the freewheeling mode is responsive to the current measurement being less than the mode threshold,
      wherein control in the synchronous rectification mode is responsive to the current measurement being greater than the mode threshold.

10. The device of claim 9, wherein:
    the motor includes a first winding; and
    the power switching network includes:
       a first high side switch coupled to a first terminal of the first winding,
       a second high side switch coupled to a second terminal of the first winding,
       a first low side switch coupled to the second terminal of the first winding, and a second low side switch coupled to the first terminal of the first winding, wherein, while operating in the synchronous rectification mode, the electronic processor is configured to enable the first high side switch and the first low side switch, periodically enable and disable the one of the first low side switch and the first high side switch, and enable one of the second high side switch during periods in which the first low side switch is disabled and the second low side switch during periods in which the first high side switch is disabled.

11. The device of claim 10, wherein the electronic processor is configured to select the mode threshold and control the power switching network according to one of the freewheeling mode or the synchronous mode by:

receiving a rectification mode curve indicating current as a function of off time of the first low side switch;

determining an off time associated with the current measurement based on parameters of a pulse width modulation signal applied to the first low side switch;

controlling the power switching network in the freewheeling mode responsive to the current measurement being above the rectification mode curve for the determined off time; and controlling the power switching network in the synchronous rectification mode responsive to the current measurement being below the rectification mode curve for the determined off time.

12. The device of claim 9, wherein:

the motor includes a first winding; and the power switching network includes:

a first high side switch coupled to a first terminal of the first winding, a second high side switch coupled to a second terminal of the first winding, the second high side switch having a body diode; and a first low side switch coupled to the second terminal of the first winding, wherein, while operating in the freewheeling mode, the electronic processor is configured to enable the first high side switch and periodically enable and disable the first low side switch, and wherein current in the first winding flows through the body diode of the second high side switch during periods in which the first low side switch is disabled.

13. The device of claim 9, wherein the electronic processor is configured to apply a hysteresis band to the mode threshold for changing from the freewheeling mode to the synchronous rectification mode and from the synchronous rectification mode to the freewheeling mode.

14. A method for operating a gas-engine replacement device, the gas-engine replacement device including a housing, the housing including a battery receptacle configured to removably receive a battery pack, a motor located within the housing, a power take-off shaft receiving torque from the motor and protruding from a side of the housing, a power switching network configured to selectively provide power from the battery pack to the motor, and an electronic processor coupled to the power switching network and configured to control the power switching network to rotate the motor, the method comprising:

receiving, by the electronic processor, a current measurement associated with the motor;

selecting, by the electronic processor, a mode threshold based on an operating parameter of the motor, the method threshold selected to be above a current range where discontinuous conduction occurs for the motor; and controlling, by the electronic processor, the power switching network according to one of a freewheeling mode or a synchronous rectification mode based on the current measurement, wherein control in the freewheeling mode is responsive to the current measurement being less than the mode threshold, wherein control in the synchronous rectification mode is responsive to the current measurement being greater than the mode threshold.

15. The method of claim 14, wherein the motor includes a first winding, and the power switching network includes a first high side switch coupled to a first terminal of the first winding, a second high side switch coupled to a second terminal of the first winding, a first low side switch coupled to the second terminal of the first winding, and a second low side switch coupled to the first terminal of the first winding, the method further comprising:

while operating in the synchronous rectification mode:

enabling the first high side switch and the first low side switch, periodically enabling and disabling the one of the first low side switch and the first high side switch, and enabling one of the second high side switch during periods in which the first low side switch is disabled and the second low side switch during periods in which the first high side switch is disabled.

16. The method of claim 15, wherein selecting the mode threshold and controlling the power switching network according to one of the freewheeling mode or the synchronous mode includes:

receiving a rectification mode curve indicating current as a function of off time of the first low side switch;

determining an off time associated with the current measurement based on parameters of a pulse width modulation signal applied to the first low side switch;

controlling the power switching network in the freewheeling mode responsive to the current measurement being above the rectification mode curve for the determined off time; and controlling the power switching network in the synchronous rectification mode responsive to the current measurement being below the rectification mode curve for the determined off time.

17. The method of claim 14, wherein the motor includes a first winding and the power switching network includes a first high side switch coupled to a first terminal of the first winding, a second high side switch coupled to a second terminal of the first winding, the second high side switch having a body diode, and a first low side switch coupled to the second terminal of the first winding, the method further comprising:

while operating in the freewheeling mode:

enabling the first high side switch and periodically enabling and disabling the first low side switch, and wherein current in the first winding flows through the body diode of the second high side switch during periods in which the first low side switch is disabled.

18. The method of claim 14, further comprising:

applying a hysteresis band to the mode threshold for changing from the freewheeling mode to the synchronous rectification mode and from the synchronous rectification mode to the freewheeling mode.

19. The method of claim 14, wherein the operating parameter of the motor is one selected from a group consisting of a duty cycle, a switching frequency, and the current measurement associated with the motor.

* * * * *